US010785818B2

(12) United States Patent
Sridhara et al.

(10) Patent No.: US 10,785,818 B2
(45) Date of Patent: Sep. 22, 2020

(54) COORDINATION BETWEEN WIRELESS AUDIO DEVICES

(71) Applicant: QUALCOMM Incorporated, San Diego, CA (US)

(72) Inventors: Srivathsa Sridhara, Bhadravathi (IN); Ravi Shekhar, Thubarahalli (IN); Dishant Srivastava, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 16/136,748

(22) Filed: Sep. 20, 2018

(65) Prior Publication Data

US 2020/0100307 A1 Mar. 26, 2020

(51) Int. Cl.
*H04W 76/15* (2018.01)
*H04B 17/318* (2015.01)
*H04R 3/12* (2006.01)
*H04W 76/14* (2018.01)
*H04W 84/18* (2009.01)

(52) U.S. Cl.
CPC .......... *H04W 76/15* (2018.02); *H04B 17/318* (2015.01); *H04R 3/12* (2013.01); *H04W 76/14* (2018.02); *H04R 2420/07* (2013.01); *H04W 84/18* (2013.01)

(58) Field of Classification Search
CPC ..... H04W 76/15; H04W 76/14; H04W 84/18; H04B 17/318; H04R 3/12; H04R 2420/07
See application file for complete search history.

(56) References Cited

U.S. PATENT DOCUMENTS

| 2017/0013103 | A1* | 1/2017 | Jakobsen | H04M 1/6066 |
| 2018/0279202 | A1* | 9/2018 | Tenny | H04B 7/2606 |
| 2019/0104424 | A1* | 4/2019 | Hariharan | H04R 3/12 |
| 2019/0182878 | A1* | 6/2019 | Huang | H04M 1/7253 |
| 2019/0287108 | A1* | 9/2019 | White | G06Q 20/409 |
| 2019/0373653 | A1* | 12/2019 | Kwon | H04W 12/003 |

* cited by examiner

*Primary Examiner* — Saad A. Waqas
(74) *Attorney, Agent, or Firm* — Holland & Hart LLP/Qualcomm

(57) ABSTRACT

A first Bluetooth audio device paired with a second Bluetooth audio device may coordinate communications between the two BT audio devices. The first Bluetooth audio device may originally communication with the second BT audio device over a first type of Bluetooth connection. When the first Bluetooth audio device determines that the second Bluetooth audio device has left or is close to leaving the range of the first Bluetooth audio device, the first Bluetooth audio device may switch to communicating with the second Bluetooth audio device over a second type of Bluetooth connection or over a wireless mesh network. The first Bluetooth audio device may maintain a Bluetooth connection of the first type with a mobile device regardless of how the first Bluetooth audio device communicates with the second Bluetooth audio device.

16 Claims, 7 Drawing Sheets

COORDINATION BETWEEN WIRELESS AUDIO DEVICES

BACKGROUND

The following relates generally to wireless communications, and more specifically to coordination between wireless audio devices.

Wireless communications systems are widely deployed to provide various types of communication content such as voice, video, packet data, messaging, broadcast, and so on. Wireless Personal Area Network (PAN) communications such as Bluetooth communications may allow for short range wireless connections between two or more paired wireless devices (e.g., that have established a wireless communication channel or link).

For example, mobile devices such as mobile phones may use wireless communications to exchange data such as audio signals with other devices, such as paired audio devices (e.g., wireless earbuds). Although the audio devices may be separate physical entities, for communication purposes they may be perceived in certain cases by the mobile phone as a single device. So a pair of audio devices may communicate with each other to synchronize their operations and appear as a single interface to a phone. But in some scenarios, two audio devices may be out of range (e.g., with each other) even though at least one if not both are still independently in range of their serving phone. This may result in a loss on synchrony between the audio devices, and a communication break down between the audio devices and/or the mobile phone.

SUMMARY

The described techniques relate to improved methods, systems, devices, or apparatuses that support coordination between wireless audio devices. Generally, the described techniques support communication between multiple wireless audio devices when one of the wireless audio devices leaves the range of the other. For example, when a first wireless audio device paired with a second wireless audio device determines that the second wireless audio device is nearly out of communication range, or already out of communication range, the first wireless audio device may 1) switch from communicating with the second wireless audio device over one type of connection (e.g., a low energy (LE) Bluetooth (BT) connection) to another type of connection (e.g., a type of LE BT connection with extended range); and/or 2) the first wireless audio device may switch to communicating with the second wireless audio device over a wireless mesh network.

A method of wireless communication at a first BT audio device is described. The method may include communicating with a mobile device and a second BT audio device over a first type of LE BT connection, determining, based on communicating with the second BT audio device, a link quality for the LE BT connection with the second BT audio device, detecting, while in range of the mobile device and based on the link quality, that the second BT audio device is out of range of the first BT audio device or at a distance exceeding a threshold distance from the first BT audio device, and switching, based on the detection, from communicating with the second BT audio device over the first type of LE BT connection to communicating with the second BT audio device over a BT long range connection or over a wireless mesh network.

An apparatus for wireless communication at a first BT audio device is described. The apparatus may include a processor, memory in electronic communication with the processor, and instructions stored in the memory. The instructions may be executable by the processor to cause the apparatus to communicate with a mobile device and a second BT audio device over a first type of LE BT connection, determine, based on communicating with the second BT audio device, a link quality for the LE BT connection with the second BT audio device, detect, while in range of the mobile device and based on the link quality, that the second BT audio device is out of range of the first BT audio device or at a distance exceeding a threshold distance from the first BT audio device, and switch, based on the detection, from communicating with the second BT audio device over the first type of LE BT connection to communicating with the second BT audio device over a BT long range connection or over a wireless mesh network.

Another apparatus for wireless communication at a first BT audio device is described. The apparatus may include means for communicating with a mobile device and a second BT audio device over a first type of LE BT connection, determining, based on communicating with the second BT audio device, a link quality for the LE BT connection with the second BT audio device, detecting, while in range of the mobile device and based on the link quality, that the second BT audio device is out of range of the first BT audio device or at a distance exceeding a threshold distance from the first BT audio device, and switching, based on the detection, from communicating with the second BT audio device over the first type of LE BT connection to communicating with the second BT audio device over a BT long range connection or over a wireless mesh network.

A non-transitory computer-readable medium storing code for wireless communication at a first BT audio device is described. The code may include instructions executable by a processor to communicate with a mobile device and a second BT audio device over a first type of LE BT connection, determine, based on communicating with the second BT audio device, a link quality for the LE BT connection with the second BT audio device, detect, while in range of the mobile device and based on the link quality, that the second BT audio device is out of range of the first BT audio device or at a distance exceeding a threshold distance from the first BT audio device, and switch, based on the detection, from communicating with the second BT audio device over the first type of LE BT connection to communicating with the second BT audio device over a BT long range connection or over a wireless mesh network.

Some examples of the method, apparatuses, and non-transitory computer-readable medium described herein may further include operations, features, means, or instructions for transmitting connection status information to the second BT audio device over the wireless mesh network based on switching to communicating with the second BT audio device over the wireless mesh network.

Some examples of the method, apparatuses, and non-transitory computer-readable medium described herein may further include operations, features, means, or instructions for receiving a request for connection status information from the second BT audio device over the wireless mesh network, where transmitting the connection status information may be in response to the request.

In some examples of the method, apparatuses, and non-transitory computer-readable medium described herein, the connection status information includes information for connecting to the first BT audio device or for connecting to the mobile device.

Some examples of the method, apparatuses, and non-transitory computer-readable medium described herein may further include operations, features, means, or instructions for transmitting an indication to the second BT audio device, based on detecting that the second BT audio device may be out of range or at the distance exceeding the threshold distance, that the first BT audio device may be configured to interface with the mobile device on behalf of the second BT audio device.

Some examples of the method, apparatuses, and non-transitory computer-readable medium described herein may further include operations, features, means, or instructions for detecting that the second BT audio device may be out of range of the first BT audio device and notifying the second BT audio device, over the BT long range connection or over the wireless mesh network through at least one device, that the first BT audio device may be connected to the mobile device.

Some examples of the method, apparatuses, and non-transitory computer-readable medium described herein may further include operations, features, means, or instructions for establishing the first type of LE BT connection with the mobile device, where the first BT audio device and the second BT audio device maintain separate LE BT connections of the first type with the mobile device while the second BT audio device may be out of range of the first BT audio device.

Some examples of the method, apparatuses, and non-transitory computer-readable medium described herein may further include operations, features, means, or instructions for determining that the second BT audio device may be in range of the first BT audio device and switching to communicating with the second BT audio device over the first type of LE BT connection when the second BT audio device may be in range of the first BT audio device.

Some examples of the method, apparatuses, and non-transitory computer-readable medium described herein may further include operations, features, means, or instructions for maintaining the first type of LE BT connection with the mobile device after switching to communicating with the second BT audio device over the BT long range connection or over the wireless mesh network.

In some examples of the method, apparatuses, and non-transitory computer-readable medium described herein, communicating with the second BT audio device over the wireless mesh network may include operations, features, means, or instructions for transmitting information intended for the second BT audio device to at least one other BT device acting as a relay.

In some examples of the method, apparatuses, and non-transitory computer-readable medium described herein, determining the link quality may include operations, features, means, or instructions for determining one or more of a received signal strength indicator (RSSI) value, a quantity of retransmissions, or a quantity of packet errors.

In some examples of the method, apparatuses, and non-transitory computer-readable medium described herein, the first type of LE BT connection includes 1M PHY or 2M PHY, and where the BT long range connection includes coded PHY.

DETAILED DESCRIPTION

A mobile device may communicate with multiple wireless audio devices (e.g., wireless earbuds) over Bluetooth so that the audio devices can output audio signals. To work properly together, the audio devices may exchange control signaling with one another. But in some cases, the audio devices may be out of range with respect to each other even though they are in range of the mobile device. In such scenarios, the audio devices may lose connectivity and thus may be unable to effectively exchange control information that facilitates tandem operations.

According to the techniques described herein, a paired audio device may prevent connectivity loss based on or by detecting when its counterpart is going out of range. Based on or upon such a detection, the audio devices may switch to communicating with its counterpart over a second communication protocol or through a mesh network. For example, the audio device may establish a Bluetooth long range connection with its counterpart audio device and provide control information via the connection. Or the audio device may communicate control information through (e.g., indirectly) one or more intermediary devices participating in a mesh network. The control information may allow the pair of audio devices to continue to engage with the mobile device and coordinate their operations despite lost or diminished connectivity, which may improve user experience.

Aspects of the disclosure are initially described in the context of a wireless communications system. Example devices and process flows implementing the described techniques are then discussed. Aspects of the disclosure are further illustrated by and described with reference to apparatus diagrams, system diagrams, and flowcharts that relate to coordination between wireless audio devices.

Figure 1:
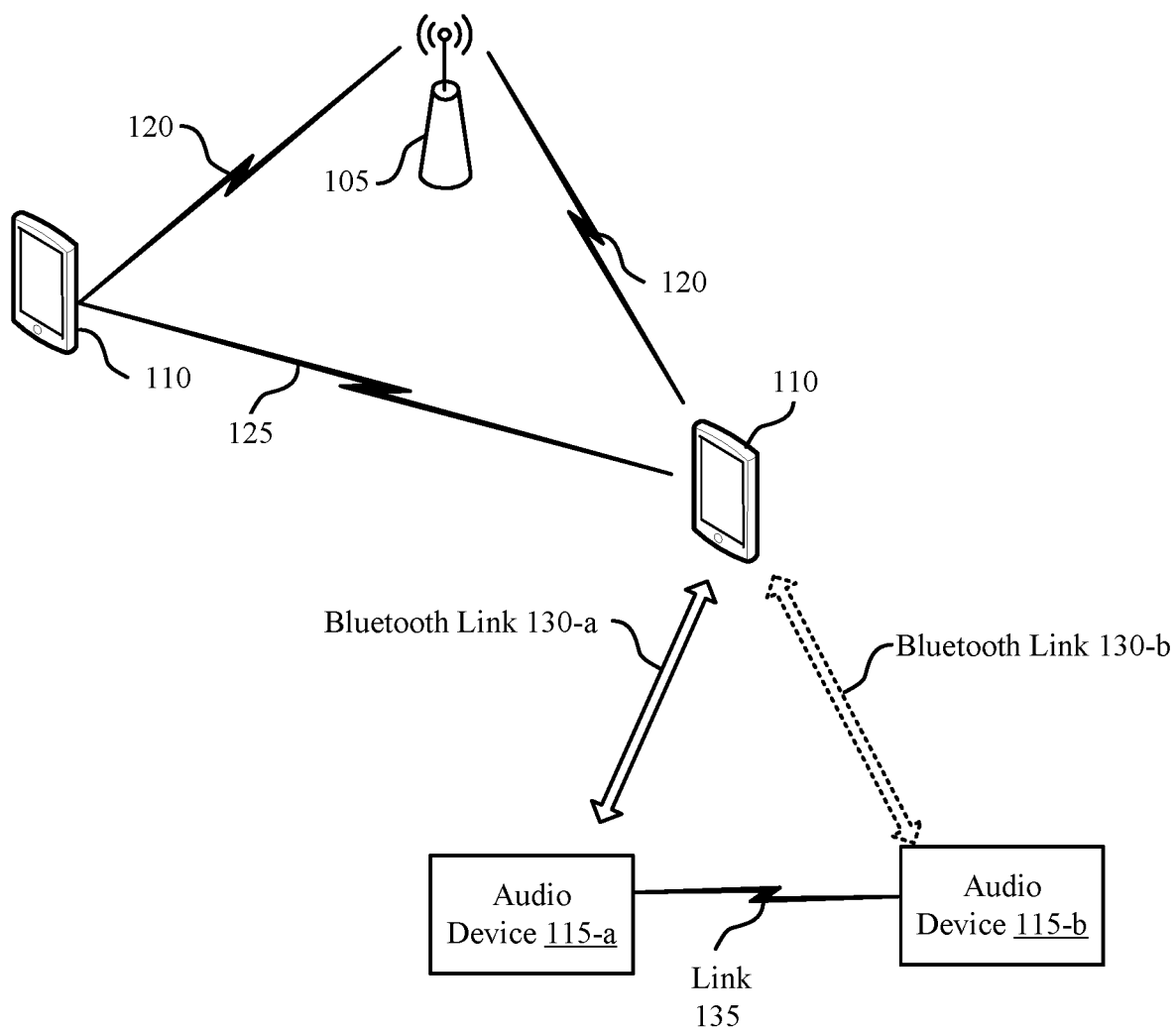
FIG. 1 illustrates a wireless communications system configured in accordance with various aspects of the present disclosure.

FIG. 1 illustrates a wireless communications system 100 (e.g., which may include to refer to a wireless personal area network (PAN), a wireless local area network (WLAN), or a Wi-Fi network, among others) configured in accordance with various aspects of the present disclosure. In the present example, devices in wireless communications system 100 may support Bluetooth communications with one or more paired audio devices 115. For example, devices 110 may include cell phones, mobile stations, personal digital assistant (PDAs), other handheld devices, netbooks, notebook computers, tablet computers, laptops, or some other suitable terminology. Audio devices 115 may include Bluetooth devices capable of pairing with other Bluetooth devices (e.g., such as devices 110), and may include wireless headsets, speakers, ear pieces, headphones, display devices (e.g., TVs, computer monitors), microphones, meters, valves, etc.

Bluetooth communications may refer to a short-range communication protocol and may be used to connect and exchange information between devices 110 and audio devices 115 (e.g., between mobile phones, computers, digital cameras, wireless headsets, speakers, keyboards, mice or other input peripherals, and similar devices). Bluetooth systems (e.g., aspects of wireless communications system 100) may be organized using a master-slave relationship employing a time division duplex protocol having, for example, defined time slots of 625 mu secs, in which transmission alternates between the master device (e.g., a device 110) and one or more slave devices (e.g., audio devices 115). In some cases, a device 110 may generally refer to a master device, and an audio device 115 may refer to a slave device in a PAN. As such, in some cases, a device may be referred to as either a device 110 or an audio device 115 based on the Bluetooth role configuration of the device. That is, designation of a device as either a device 110 or an audio device 115 may not necessarily indicate a distinction in device capability, but rather may refer to or indicate roles held by the device in the PAN.

Generally, device 110 may refer to a wireless communication device capable of wirelessly exchanging data signals with another device, and audio device 115 may refer to a device operating in a slave role, or to a short-range wireless device capable of exchanging data signals with the mobile device (e.g., using Bluetooth communication protocols). Bluetooth systems (e.g., aspects of wireless communications system 100) may be organized using a master-slave relationship employing a time division duplex protocol having, for example, defined time slots of 625 mu secs, in which transmission alternates between the master (e.g., device 110) and slave (e.g., audio device 115). In some cases, certain types of Bluetooth communications (e.g., such as high quality or high definition (HD) Bluetooth) may require enhanced quality of service.

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., a device 110) implements an audio source device (SRC) role and another device (e.g., an audio device 115) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data.

The controller stack is generally implemented in a low cost silicon device containing the Bluetooth radio and a microprocessor. The controller stack may be responsible for setting up links 130 such as asynchronous connection-less (ACL) links, synchronous connection orientated (SCO) links, etc. Further, the controller stack may implement link management protocol (LMP) functions, low energy link layer (LE LL) functions, etc.

The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A link 130 established between two Bluetooth devices (e.g., between a device 110 and an audio device 115) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., an audio device 115) are acknowledged, and may be retransmitted if not acknowledged during a retransmission window. In addition, audio may be streamed between a device 110 and an audio device 115 using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a device 110 may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. For example, AP 105 may act as an intermediary for two devices 110, which may communicate with AP 105 via respective communication links 120. Or two devices 110 may communicate with one another directly via communication link 125. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100. AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content (e.g., media content, video content, audio content, etc.) exchanged between a device 110 and an audio device 115 may originate from a WLAN. For example, in some cases, a device 110 may receive audio content from an AP 105 (e.g., via WLAN communications), and the device 110 may then implement the described techniques to relay or pass the audio content to the audio device(s) 115 (e.g., via Bluetooth communications).

In some example, the audio content may be streamed over Bluetooth Basic Rate/Enhanced Data Rate (BR/EDR). In BR/EDR, a device 110 may communicate exclusively with one of the audio devices 115, which interfaces with the device 110 on behalf of the other audio device 115 (e.g., audio device 115-*a* may receive content from device 110, and relay it to audio device 115-*b*). The audio device 115 responsible for interfacing with the device 110 may be referred to as the primary audio device, and the other audio device 115 may be referred to as the secondary audio device. Thus, the content may be transmitted from device 110 to audio device 115-*a* over Bluetooth link 130, which may be established using a low energy (LE) Bluetooth protocol, such as LE 1M PHY or LE 2M PHY. And then the content may be transmitted (e.g., relayed) from audio device 115-*a* to audio device 115-*b* over link 135, which may be an LE 1M PHY or LE 2M PHY connection.

In other examples, audio content may be streamed using LE isochronous. In LE isochronous, the device 110 may communicate with both audio devices 115 at the same time.

For example, the device 110 may stream audio content to audio device 115-*a* via Bluetooth link 130-*a* and stream audio content to audio device 115-*b* via Bluetooth link 130-*b*. However, the primary audio device 115 may be responsible for forwarding control information to the secondary device so that the secondary device is able to interact with the mobile device (e.g., play audio content from the mobile device or connect to calls). For example, the primary audio device 115-*a* may transmit control information to the secondary device 115-*b* over link 135.

Regardless of which communication protocol is used to convey the audio content (e.g., BR/EDR, LE isochronous, or some other protocol), audio devices 115 may exchange control information between one another to facilitate a coordinated auditory experience.

However, in some cases, a pair of audio devices 115 may be separated so that they lose connectivity with one another. Loss of such connectivity may cause an audio device 115 to lose synchrony with the other audio device 115, behave abnormally, or lose the ability to interact with the other audio device and/or device 110.

According to the techniques described herein, one of the audio devices 115 (e.g., a primary audio device) may evaluate the quality of link 135 and detect when loss of connection is likely, imminent, or has already occurred (e.g., based on a quantity of packet errors exceeding a threshold). To prevent loss of communication (or to re-establish communication), audio device 115-*a* may establish a connection with audio device 115-*b* using a wireless communication (e.g., BT protocol) with extended range compared to the collapsed link. For example, audio device 115-*a* may switch from communicating with audio device 115-*b* over a first type of wireless connection, which may be a BT connection (e.g., LE 1M PHY or LE 2M PHY), to communicating with audio device 115-*b* over a second type of wireless connection, which may be a BT connection (e.g., BT long range, which may include coded PHY). Alternatively, audio device 115-*a* may communicate with device 115-*b* through one or more devices (e.g., relay devices) participating in a mesh network.

Although certain aspects of the disclosure are described in the context of Bluetooth, the techniques described herein are not limited to Bluetooth and can be implemented using other types of near field communication protocols.

Figure 2:
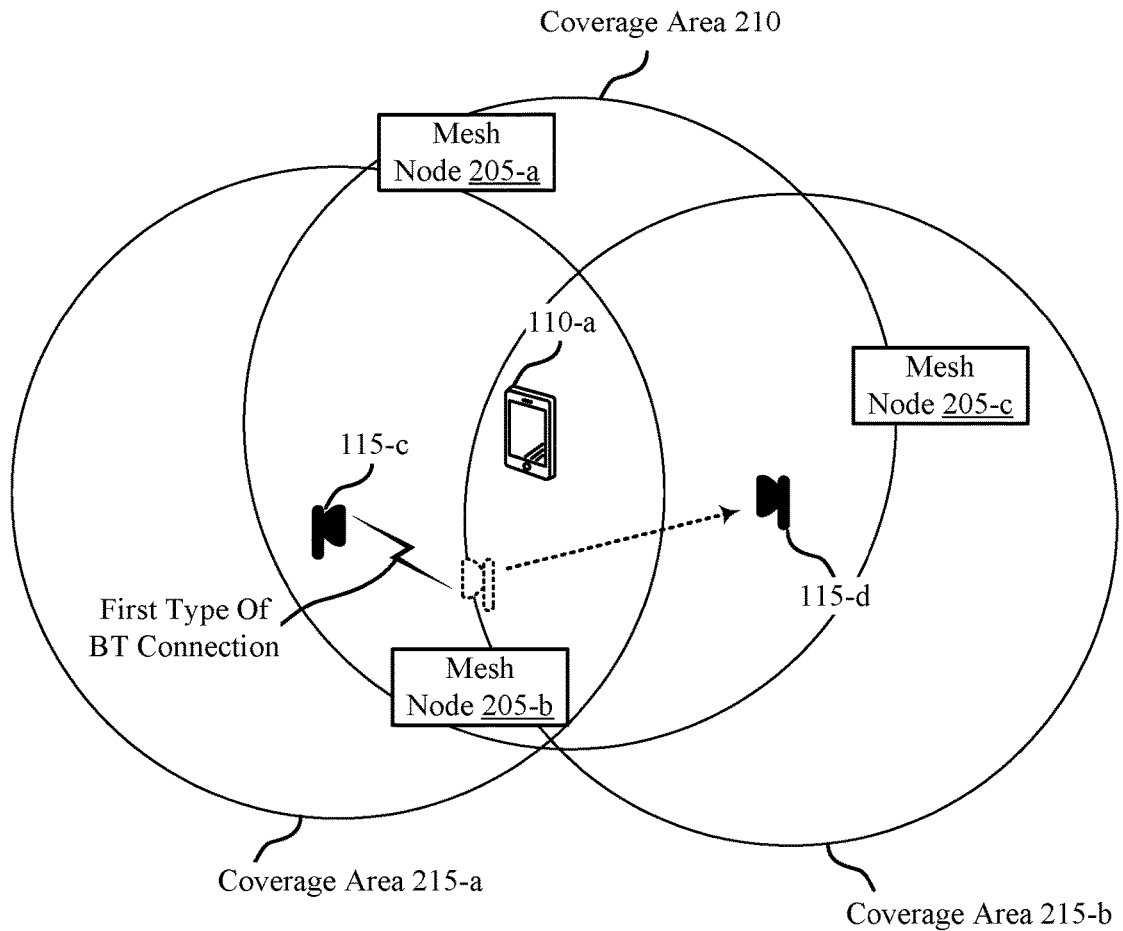
FIG. 2 illustrates an example wireless communications system that supports coordination between wireless audio devices in accordance with aspects of the present disclosure.

FIG. 2 illustrates an example wireless communications system 200 that supports coordination between wireless audio devices in accordance with aspects of the present disclosure. Wireless communications system 200 may include device 110-*a* and audio devices 115-*c* and 115-*d*, which may be examples of the respective devices described with reference to FIG. 1. Wireless communications system 200 may also include mesh nodes 205, which may be devices that form part or all of a mesh network.

Wireless device 110-*a* may initially be connected to both audio devices 115, which may in some cases be paired devices (e.g., devices configured to operate in conjunction with one another). Although shown as wireless earpieces or earbuds, the audio devices 115 can be any devices capable of rendering audio content, including wireless headsets, speakers, headphones, display devices (e.g., TVs, computer monitors), microphones, etc. Wireless device 110-*a* may be connected to one or both of the audio devices 115 via a first type of LE Bluetooth link, such as LE 1M PHY or L1 2M PHY, and may maintain connectivity with the audio devices 115 as long as they are within coverage area 210. For example, wireless device 110-a may interact with the audio device 115 using BR-EDR or LE isochronous techniques while the audio devices are inside coverage area 210. As described herein, the term "link" may be interchangeable with the term "connection."

The audio devices 115 may also communicate with each other using the first type of LE Bluetooth connection. However, the first type of LE BT connection may have a limited range, which may result in limited coverage areas 215 (e.g., primary audio device 115-c may have coverage area 215-a and secondary audio device may have coverage area 215-b). While the secondary audio device 115-d is in range of the primary audio device 115-c (e.g., within coverage area 215), the devices may communicate control and/or content information via the first type of Bluetooth connection. When the secondary audio device 115-d moves out of range of the primary audio device 115-c, however, the first type of LE BT connection may be lost, or the quality of the link may deteriorate to a level that prevents information sharing.

In one example, the secondary audio device 115-d may move out of range of the primary audio device 115-c but remain in range of the device 110-a (e.g., two users sharing the audio devices 115 may separate from each other but remain within coverage area 210). In such cases, loss of connectivity with the primary audio device 115-d may impair the ability of the secondary audio device 115-d to engage with the device 110-a even though the secondary device is still within range of the device 110-a. For example, the secondary audio device 115-d may be prevented from decoding packets sent by the device 110-a because the primary audio device 115-c is no longer able to provide the secondary audio device 115-d with information, such as decoding information (e.g., sequence number, encryption key, frequency hopping synchronization (FHS), etc.) over the first type of Bluetooth link.

In another example, the secondary audio device 115-d may lose connection with both the primary audio device and the device 110-a (e.g., a user may carry the device 110-a and primary audio device 115-c away from the secondary device). In such cases, the secondary audio device 115-d may attempt to connect to the device 110-a in a primary device capacity when the device 110-a comes back into range (e.g., because the secondary audio device 115-d is unaware that primary audio device 115-c is already connected to the device 110-a as the primary device). But an attempt by both audio devices 115 to operate as the primary device may disrupt communications until the situation is resolved (e.g., until one of the audio devices 115 takes on the role of the primary device and the other takes on the role of the secondary device).

According to the techniques described herein, the primary audio device 115-c may detect when the secondary audio device 115-d is at risk of going out of range (e.g., based on the received signal strength indicator (RSSI) for communications between the audio devices 115), or is already out of range, and take actions to ensure that the primary audio device 115-c can communicate with the secondary audio device 115-d. For example, the primary audio device 115-c can switch a connection from the first type of Bluetooth connection (e.g., LE 1M PHY or LE 2M PHY) to a second type of Bluetooth connection (e.g., Bluetooth long range, such as coded PHY). The second type of Bluetooth connection may have an extended range compared to the first type of Bluetooth connection so that the primary audio device 115-c and the secondary audio device 115-d can continue to communicate despite the other adverse condition.

Alternatively, the primary audio device 115-c may additionally or alternatively communicate with the secondary device 115-d via the mesh network. For example, the primary audio device 115-c may send control information to the secondary audio device 115-d (e.g., by sending it to an intermediary node, such as mesh node 205-b, which may relay the control information to secondary audio device 115-d). In some cases, multiple mesh nodes 205 may be involved in relaying the control information from the primary audio device 115-c to the secondary audio device 115-d.

In some cases, the primary audio device 115-c may determine which technique to use based on one or more factors, including battery life, proximity of mesh nodes, the type of control information to be communicated, and the connection status of the secondary audio device 115-d with respect to the wireless device 110-a. In some cases, the primary audio device 115-c may switch between the techniques. For example, the primary audio device 115-c may use the second type of Bluetooth connection in certain scenarios and use the mesh connection in other scenarios.

Regardless of which technique is used (e.g., switching to a Bluetooth long range connection or using the mesh network), the information communicated by the primary audio device 115-c may enable the secondary device 115-d to continue to operate in coordination with the primary audio device 115-c, continue decoding packets from mobile device 110-a, and/or prepare for communications with the primary audio device (or device 110-a) when the primary device (or device 110-a) comes back into range.

As referred to herein, the coverage area of device may refer to the area within which the device is able to send and transmit signals to another device while maintaining a threshold reliability or error rate. Although shown with fixed radii, the coverage areas 215 may be semi-static or dynamic based on the current radio conditions and physical surroundings. Accordingly, the primary audio device 115-c may monitor the quality of a link between the primary audio device 115-c and the secondary audio device 115-d to determine when the secondary device 115-c is approaching the edge of coverage area 215-a (e.g., based on distance, link quality, retransmissions, packets errors, RSSI, signal to noise ratio (SNR), and/or other factors or metrics), or has crossed it. The primary audio device 115-c may determine that the secondary audio device 115-d is near the edge of coverage area 215-a by determining that the secondary audio device 115-d is at a distance (from the primary audio device 115-c) that satisfies a threshold distance (e.g., a distance that is a fraction of the radius of coverage area 215-a).

To determine the distance of the secondary audio device 115-d, the primary audio device 115-c may, as one example, monitor the received signal strength indicator (RSSI) of communications with the secondary audio device 115-d. Additionally or alternatively, the primary audio device 115-c may monitor the number of retransmissions between the primary audio device 115-c and the secondary audio device 115-d. Additionally or alternatively, the primary audio device 115-c may monitor the number of packet errors received from (or transmitted to) the secondary audio device 115-d. Based on one or more of these metrics, the primary audio device 115-c may determine when the secondary audio device 115-d is in danger of losing connectivity and implement the techniques described herein to preserve the ability to communicate.

Figure 3:
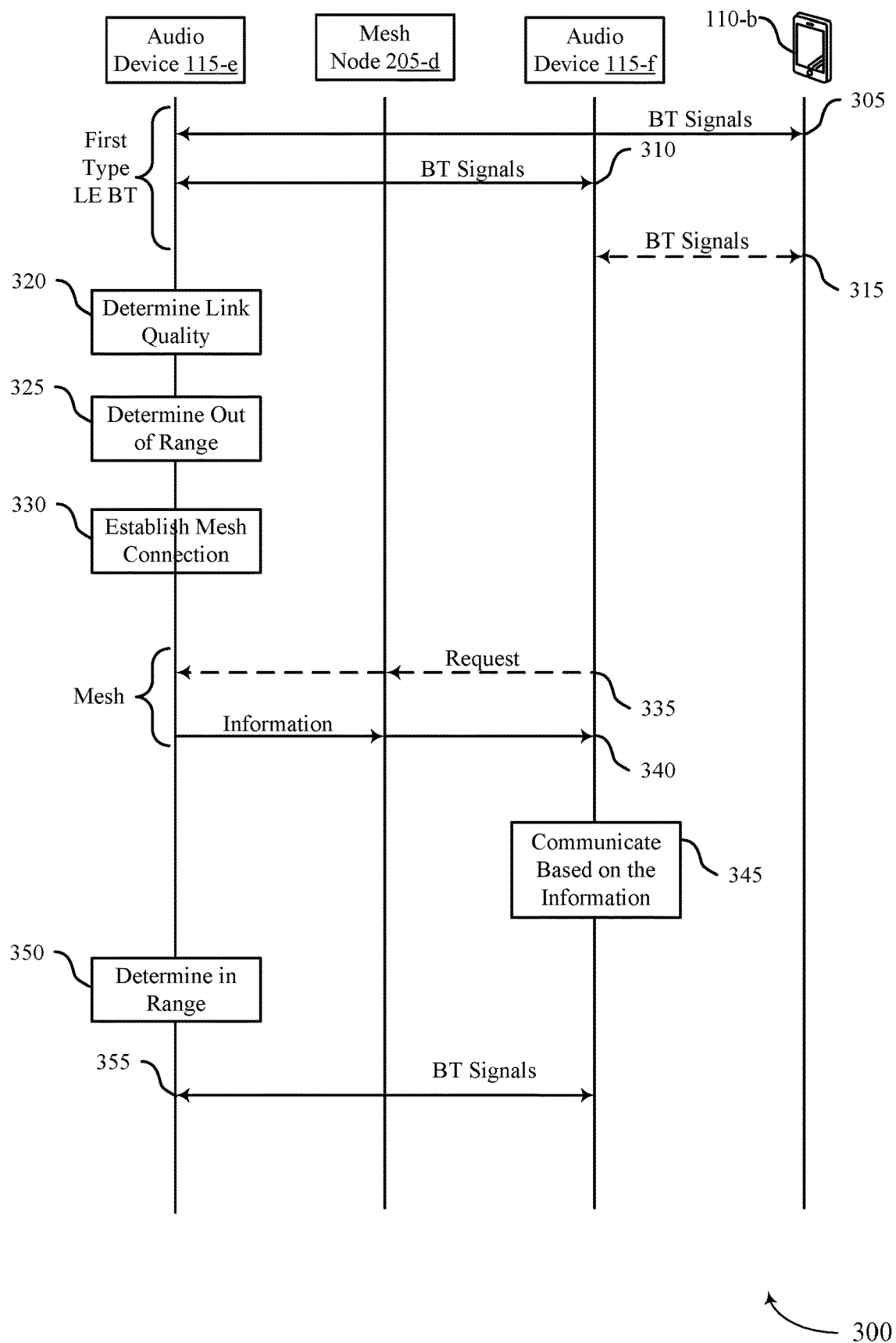
FIG. 3 illustrates an example of a process flow that supports coordination between wireless audio devices in accordance with aspects of the present disclosure.

FIG. 3 illustrates an example of a process flow 300 that supports coordination between wireless audio devices in accordance with aspects of the present disclosure. In some examples, process flow 300 may implement aspects of wireless communications system 100 or 200. Process flow 300 may illustrate operations conducted by an audio device 115. In the following description of the process flow 300, the passing of information between audio device 115-*e*, audio device 115-*f*, mesh node 205-*d*, and device 110-*b* may be performed in a different order than the exemplary order shown, or the operations performed by audio device 115-*e*, audio device 115-*f*, mesh node 205-*d*, and device 110-*b* may be performed in different orders or at different times. In some cases, certain operations may also be omitted from the process flow 300, or other operations may be added to the process flow 300.

At 305, audio device 115-*e* (e.g., a first audio device, which may be acting in a primary audio device capacity) may exchange Bluetooth signals with device 110-*b* over a first type of LE Bluetooth connection. The Bluetooth signals may convey, among other things, audio content and/or control information. At 310, audio device 115-*e* may exchange Bluetooth signals with audio device 115-*f* (e.g., a second audio device, which may be acting in a secondary audio device capacity) over the first type of LE Bluetooth connection. In some cases (e.g., in LE isochronous schemes), secondary audio device 115-*f* may also, at 315, exchange Bluetooth signals with device 110-*b* over the first type of LE Bluetooth connection. However, secondary audio device 115-*f* may rely on control and/or content information from the primary audio device 115-*e* to properly interact with audio device 115-*e* and device 110-*b*.

At 320, audio device 115-*e* may determine the quality of the link between audio device 115-*e* and audio device 115-*f*. Audio device 115-*e* may determine the quality of the link by evaluating various metrics indicative of the conditions of the link. For example, audio device 115-*e* may determine the RSSI for a quantity of packets received from audio device 115-*f*. Because higher RSSI values indicate better link conditions, RSSI values lower than a threshold value may indicate to audio device 115-*e* that audio device 115-*f* is approaching the limits of the range of audio device 115-*e* (or has already passed the limits of the range of audio device 115-*e*).

Additionally or alternatively, audio device 115-*e* may determine the quantity of retransmissions made during a period of time (e.g., audio device 115-*e* may calculate the number of retransmissions per second), or for a predetermined number of transmissions (e.g., audio device 115-*e* may calculate the number of retransmissions per n transmissions). Because higher quantities of retransmissions indicate poor link conditions, a quantity of retransmissions greater than a threshold may indicate to audio device 115-*e* that that audio device 115-*f* is almost out of range.

Additionally or alternatively, audio device 115-*e* may determine the quantity of packet errors made during a period of time (e.g., audio device 115-*e* may calculate the number of errors per second), or for a predetermined number of transmissions (e.g., audio device 115-*e* may calculate the number of errors per n packets). Because higher quantities of errors indicate poor link conditions, a quantity of errors greater than a threshold may indicate to audio device 115-*e* that that audio device 115-*f* is almost out of range.

At 325, audio device 115-*e* may determine that audio device 115-*f* is out or range, or nearly out of range (e.g., at a distance exceeding a threshold distance), based on the quality of the link between audio device 115-*e* and audio device 115-*f*. Accordingly, at 330, audio device 115-*e* may establish a connection with a mesh network (e.g., over the first type of LE BT connection or another type of connection) so that audio device 115-*e* can continue to communicate with audio device 115-*f* while audio device 115-*f* is outside, or nearly outside, the range of audio device 115-*e*. Although shown responsible to determining the range of audio device 115-*f*, in some cases, audio device 115-*f* may establish the mesh connection prior to determining the range of audio device 115-*f*.

Establishing a mesh connection may refer to the process of establishing a communication link with a mesh node (e.g., mesh node 205-*d*) that is part of a mesh network that includes audio device 115-*f*. While communicating with audio device 115-*f* via the mesh network, audio device 115-*e* may maintain the first type of LE BT connection with device 110-*b* and communicate with device 110-*b* over that connection.

After establishing the mesh connection, audio device 115-*e* may receive, and audio device 115-*f* may transmit, a request for information over the mesh network at 335. For example, audio device 115-*f* may transmit the request for information to mesh node 205-*d*, which may relay the request to audio device 115-*e*. Thus, audio device 115-*e* may receive a request for information (e.g., from at least one intermediary node acting on behalf of audio device 115-*f*). In some examples, audio device 115-*e* may receive such a request for information periodically or aperiodically.

At 340, audio device 115-*e* may transmit information (e.g., connection status information) to audio device 115-*f* via mesh node 205-*d*. For example, audio device 115-*e* may transmit information intended for audio device 115-*f* to mesh node 205-*d*, which may relay the information to audio device 115-*f*. The information may be information regarding the connection status of audio device 115-*e* relative to device 110-*b*.

In one example, the information may indicate that audio device 115-*e* already has a connection with the device 110-*b* and that audio device 115-*e* is responsible for interfacing with device 110-*b* on behalf of audio device 115-*f*. Such information may be helpful when audio device 115-*f* loses connection to device 110-*b* in addition to losing connection with audio device 115-*e*. This is because without such information, audio device 115-*f* may attempt to connect device 110-*b* as the primary device when device 110-*b* comes into range, which may lead to confusion. Thus, such information may be transmitted when audio device 115-*e* determines that audio device 115-*f* is has lost connection with device 110-*b* (e.g., is out of range of device 110-*b*). Alternatively, such information may be transmitted independent of a determination regarding the connection between audio device 115-*f* and device 110-*b*, which may decrease processing and/or communications overhead.

In another example, the information may enable audio device 115-*f* to coordinate operations with audio device 115-*e*, or information that enables audio device 115-*f* to decode packets received from device 110-*b*. For example, the information may indicate a sequence number, encryption key, or FHS that facilitates the reception of control and audio content from device 110-*b*. Thus, audio device 115-*f* may continue to receive content from device 110-*b* even though audio device 115-*f* is out of range of audio device 115-*e*.

Although shown as responsive to the request for information, in some cases, audio device 115-*e* may transmit the information independent of a request for information. And although described with reference to a single mesh node 205-*d*, the techniques described herein can be implemented using any number of one or more mesh nodes 205.

At 345, audio device 115-*f* may communicate with audio device 115-*e* or device 110-*b* based on the information received from audio device 115-*e*. For example, audio device 115-*f* may receive packets from device 110-*b* based on decoding information received from audio device 115-*e*. Or audio device 115-*f* may connect to device 110-*b* in a secondary device capacity, as opposed to a primary device capacity, (or refrain from connecting to device 110-*b* at all) based on connection status information from audio device 115-*e*. Additionally or alternatively, audio device 115-*f* may render certain audio content but not other content based on coordination information received from audio device 115-*e* (e.g., audio device 115-*f* may render bass content but not voice content, which may be rendered at audio device 115-*e*).

At 350, audio device 115-*e* may determine that audio device 115-*f* has entered into the range of audio device 115-*e*. For example, audio device 115-*e* may establish a link with audio device 115-*f* and determine that the quality of the link satisfies a threshold. Based on this determination, audio device 115-*e* may (e.g., at 355) communicate one or more BT signals with audio device 115-*f* over the first type of LE BT connection.

Figure 4:
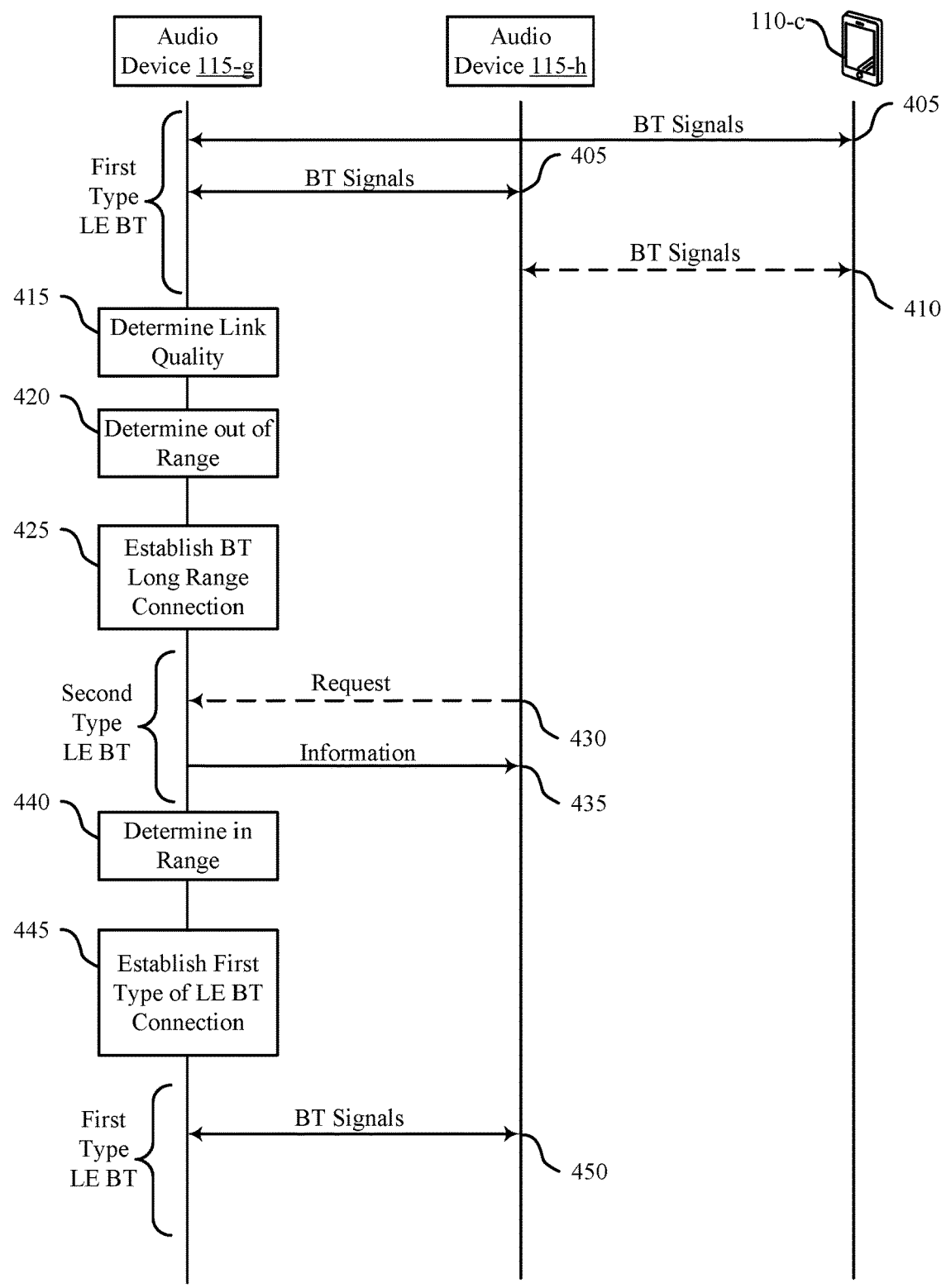
FIG. 4 illustrates an example of a process flow that supports coordination between wireless audio devices in accordance with aspects of the present disclosure.

FIG. 4 illustrates an example of a process flow 400 that supports coordination between wireless audio devices in accordance with aspects of the present disclosure. In some examples, process flow 400 may implement aspects of wireless communications system 100 or 200. Process flow 400 may illustrate operations conducted by an audio device 115. In the following description of the process flow 400, the passing of information between audio device 115-*g*, audio device 115-*h*, and device 110-*c* may be performed in a different order than the exemplary order shown, or the operations performed by audio device 115-*g*, audio device 115-*h*, and device 110-*c* may be performed in different orders or at different times. In some cases, certain operations may also be omitted from the process flow 400, or other operations may be added to the process flow 400. Process flow 400 may include certain aspects of process flow 300, or vice versa.

Prior to 405, audio device 115-*g* may establish a first type of LE BT connection (e.g., a 1M PHY or 2M PHY connection) with audio device 115-*h*. Audio device 115-*g* may also establish a separate connection of the first type with device 110-*c*. Audio device 115-*g* may use these connections to negotiate roles with audio device 115-*h* and device 110-*c*. For example, audio device 115-*g* may form an agreement (e.g., through a handshake or information sharing procedure) with audio device 115-*h* and device 110-*c* that audio device 115-*g* will act as the primary device on behalf of audio device 115-*h*.

At 405, audio device 115-*g* may communicate with device 110-*c* over the first type of LE BT connection between audio device 115-*g* and device 110-*c*. For example, audio device 115-*g* may exchange BT signals, including control and data information, with device 110-*c*. Audio device 115-*g* may maintain the first type of LE BT connection with device 110-*c* throughout process flow 400. At 410, audio device 115-*g* may communicate with device 115-*h* over the first type of LE BT connection between audio device 115-*g* and audio device 115-*h*. For example, audio device 115-*g* may exchange BT signals, including control and data information, with audio device 115-*h*. In some cases (e.g., when isochronous communications are at play), audio device 115-*h* may exchange BT signals with device 110-*c* over the first type of LE BT connection between audio device 115-*h* and device 110-*c*.

At 415, audio device 115-*g* may determine the quality of the link associated with the first type of LE BT connection between audio device 115-*g* and audio device 115-*h*. For example, audio device 115-*g* may monitor and evaluate various conditions and parameters indicative of the quality of the link. In some cases, audio device 115-*g* may quantize the quality of the link. At 420, audio device 115-*g* may determine that audio device 115-*h* is out of range or nearly out of range. For example, audio device 115-*g* may determine that audio device 115-*h* is out of range when the link quality is below a first threshold. And audio device 115-*g* may determine that audio device 115-*h* is at a distance greater than a threshold distance when the link quality is above the first threshold but below a second threshold.

At 425, audio device 115-*g* may (e.g., in response to the determination at 420), release the first type of LE BT connection with audio device 115-*h* and establish a second type of LE BT connection (e.g., a BT long range connection) with audio device 115-*h*. Thus, audio device 115-*g* may continue to communicate with audio device 115-*g* even though audio device 115-*g* is out of range of the first type of LE BT connection. For example, at 430, audio device 115-*g* may receive a request for information from audio device 115-*h* over the second type of LE BT connection. In response to the request (or independent of a request), audio device 115-*g* may, at 435, transmit information to audio device 115-*h*. The information may facilitate the operations of audio device 115-*h* and/or facilitate the interactions of audio device 115-*h* with audio device 115-*g* and/or device 110-*c*.

At 440, audio device 115-*g* may determine that audio device 115-*h* is in range (e.g., within a threshold distance) of audio device 115-*g*. Audio device 115-*g* may make such a determination based on information from mobile device 110-*c* (e.g., over the first type of LE BT connection) or audio device 115-*h* (e.g., over the second type of LE BT connection). Or audio device 115-*g* may make such a determination based on discovery signals received from and/or transmitted to audio device 115-*h*. At 445, audio device 115-*g* may (e.g., in response to the determination at 440) re-establish the first type of LE BT connection with audio device 115-*h*. Accordingly, at 450, audio device 115-*g* and audio device 115-*h* may exchange BT signals over the first type of LE BT connection.

Figure 5:
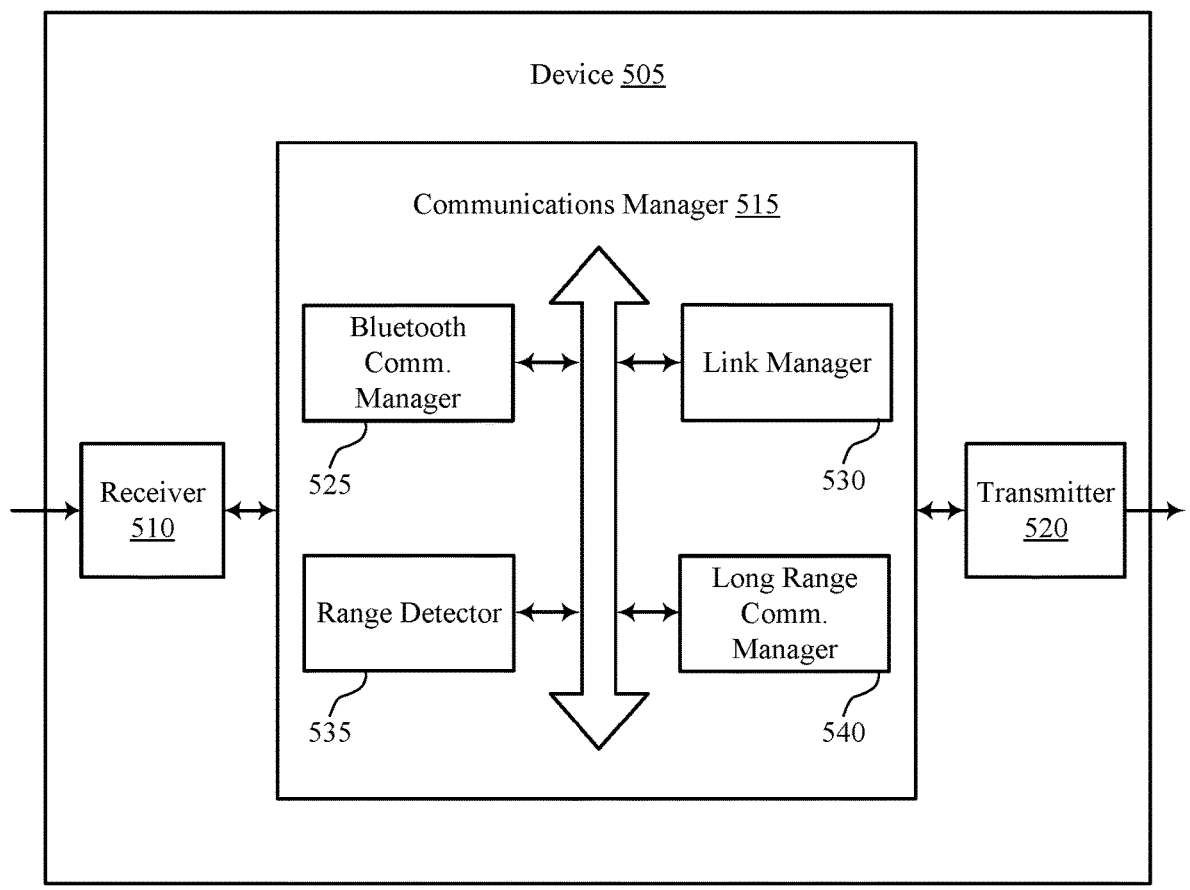
FIG. 5 shows a block diagram 500 of a Bluetooth audio device 505 that supports coordination between wireless audio devices in accordance with aspects of the present disclosure.

FIG. 5 shows a block diagram 500 of a Bluetooth audio device 505 that supports coordination between wireless audio devices in accordance with aspects of the present disclosure. The Bluetooth audio device 505 may be an example of aspects of an audio device 115 as described herein. The Bluetooth audio device 505 may include a receiver 510, a communications manager 515, and a transmitter 520. The Bluetooth audio device 505 may also include a processor. Each of these components may be in communication with one another (e.g., via one or more buses). The Bluetooth audio device 505 may be referred to as a first Bluetooth audio device.

Receiver 510 may receive information such as packets, user data, or control information associated with various information channels (e.g., control channels, data channels, and information related to coordinating wireless audio devices). Information may be passed on to other components of the device 505. The receiver 510 may be an example of aspects of the transceiver 620 described with reference to FIG. 6. The receiver 510 may utilize a single antenna or a set of antennas.

The communications manager 515 may communicate with a mobile device and a second BT audio device over a first type of LE BT connection. The communications manager 515 may determine, based at least in part on communicating with the second BT audio device, a link quality for the LE BT connection with the second BT audio device. The communications manager 515 may detect, while in range of the mobile device and based at least in part on the link quality, that the second BT audio device is out of range of the first BT audio device 505 or at a distance exceeding a threshold distance from the first BT audio device 505. And the communications manager 515 may switch, based at least in part on the detection, from communicating with the second BT audio device over the first type of LE BT connection to communicating with the second BT audio device over a BT long range connection or over a wireless mesh network.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 515 may be an example of aspects of the communications manager 610 as described herein. The communications manager 515 may include a Bluetooth communications manager 525, a link manager 530, a range detector 535, and a long range communications manager 540.

The Bluetooth communications manager 525 may communicate with a mobile device and a second BT audio device over a first type of LE BT connection. In some cases, the Bluetooth communications manager 525 may establish the first type of LE BT connection (e.g., a 1M PHY or 2M PHY connection) with the mobile device. The Bluetooth communications manager 525 may also establish another connection of the first type with the second BT audio device. In some cases, the first BT audio device 505 and the second BT audio device may maintain separate LE BT connections of the first type with the mobile device while the second BT audio device is out of range of the first BT audio device. In some cases, the Bluetooth communications manager 525 may maintain the first type of LE BT connection with the mobile device after switching to communicating with the second BT audio device over the BT long range connection or over the wireless mesh network.

The link manager 530 may determine, based at least in part on communicating with the second BT audio device, a link quality for the LE BT connection with the second BT audio device. In some cases, determining the link quality includes determining one or more of an RSSI value, a quantity of retransmissions, or a quantity of packet errors.

The range detector 535 may detect, while in range of the mobile device and based at least in part on the link quality, that the second BT audio device is out of range of the first BT audio device 505 or at a distance exceeding a threshold distance from the first BT audio device 505. In some cases, the range detector 535 may detect that the second BT audio device is out of range of the first BT audio device 505. In such cases, the long range communications manager 540 may notify the second BT audio device, over the BT long range connection or over the wireless mesh network through at least one device, that the first BT audio device 505 is connected to the mobile device.

In some cases (e.g., after determining that the second BT audio device is out of range of the first BT audio device 505), the range detector 535 may determine that the second BT audio device is in range of the first BT audio device 505. In such cases, the Bluetooth communications manager 525 may switch to communicating with the second BT audio device over the first type of LE BT connection when the second BT audio device is in range of the first BT audio device 505.

The long range communications manager 540 may facilitate communications with the second BT audio device when the second BT audio device is out of range of the first BT audio device 505. In some cases, the long range communications manager 540 may include the Bluetooth communications manager 525. When the range detector 535 detects that the second BT audio device is out of range of the first BT audio device or at a distance exceeding a threshold distance from the first BT audio device, the long range communications manager 540 may switch, based at least in part on the detection, from communicating with the second BT audio device over the first type of LE BT connection to communicating with the second BT audio device over a BT long range connection or over a wireless mesh network.

In some cases, the long range communications manager 540 may receive a request for connection status information from the second BT audio device over the wireless mesh network. In some cases, the long range communications manager 540 may transmit connection status information (e.g., information for connecting to the first BT audio device or for connecting to the mobile device) to the second BT audio device over the wireless mesh network based at least in part on switching to communicating with the second BT audio device over the wireless mesh network. The connection status information may be transmitted responsive to or independent of the request.

In some cases, the long range communications manager 540 may transmit an indication to the second BT audio device (e.g., based on detecting that the second BT audio device is out of range or at the distance exceeding the threshold distance) that the first BT audio device 505 is configured to interface with the mobile device on behalf of the second BT audio device. In some cases, the long range communications manager 540 may communicate with the second BT audio device over the mesh network by transmitting information intended for the second BT audio device to at least one other BT device (e.g., a mesh node) acting as a relay.

Transmitter 520 may transmit signals generated by other components of the device. In some examples, the transmitter 520 may be collocated with a 510 in a transceiver module. For example, the transmitter 520 may be an example of aspects of the transceiver 620 described with reference to FIG. 6. The transmitter 520 may utilize a single antenna or a set of antennas.

Figure 6:
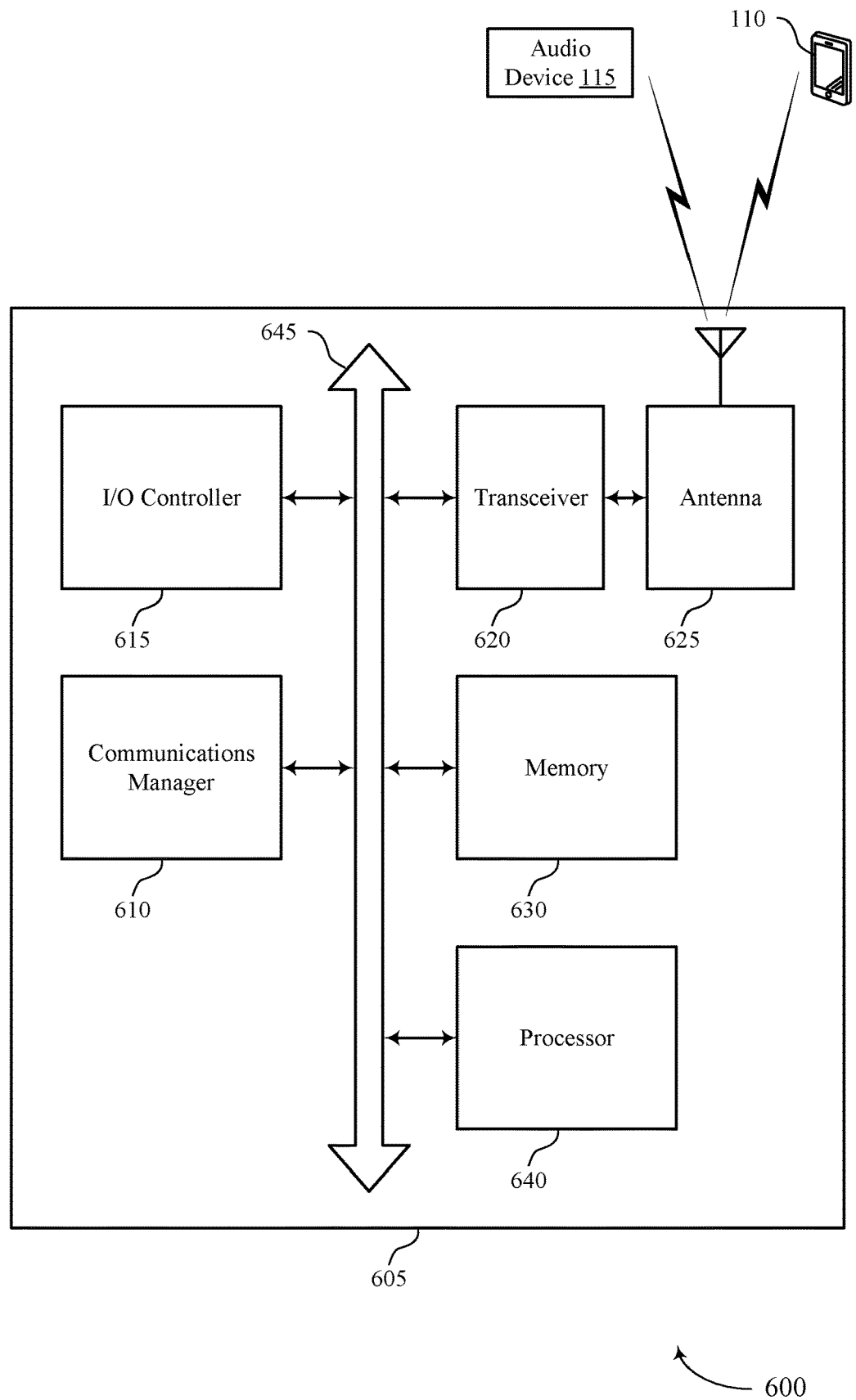
FIG. 6 shows a diagram of a system including a device that supports power optimized link quality detection and feedback in accordance with aspects of the present disclosure.

FIG. 6 shows a diagram of a system 600 including a device 605 that supports power optimized link quality detection and feedback in accordance with aspects of the present disclosure. The device 605 may be an example of or include the components of BT audio device 505 or an audio device 115 as described herein. The device 605 may include components for bi-directional voice and data communications including components for transmitting and receiving communications, including a communications manager 610, an I/O controller 615, a transceiver 620, an antenna 625, memory 630, and a processor 640. These components may be in electronic communication via one or more buses (e.g., bus 645).

The communications manager 610 may communicate with a mobile device 110 and a second BT audio device 115 over a first type of LE BT connection. The communications manager 610 may determine, based at least in part on communicating with the second BT audio device 115, a link quality for the LE BT connection with the second BT audio device 115. The communications manager 610 may detect, while in range of the mobile device 110 and based at least in part on the link quality, that the second BT audio device 115 is out of range of the device 605 or at a distance exceeding a threshold distance from the device 605. And the communications manager 610 may switch, based at least in part on the detection, from communicating with the second BT audio device 115 over the first type of LE BT connection to communicating with the second BT audio device 115 over a BT long range connection or over a wireless mesh network.

I/O controller 615 may manage input and output signals for device 605. I/O controller 615 may also manage peripherals not integrated into device 605. In some cases, I/O controller 615 may represent a physical connection or port to an external peripheral. In some cases, I/O controller 615 may utilize an operating system such as iOS®, ANDROID®, MS-DOS®, MS-WINDOWS®, OS/2®, UNIX®, LINUX®, or another known operating system. In other cases, I/O controller 615 may represent or interact with a modem, a keyboard, a mouse, a touchscreen, or a similar device. In some cases, I/O controller 615 may be implemented as part of a processor. In some cases, a user may interact with device 605 via I/O controller 615 or via hardware components controlled by I/O controller 615.

Transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include a single antenna 625. However, in some cases the device may have more than one antenna 625, which may be capable of concurrently transmitting or receiving multiple wireless transmissions.

Memory 630 may include RAM and ROM. The memory 630 may store computer-readable, computer-executable software 635 including instructions that, when executed, cause the processor to perform various functions described herein. In some cases, the memory 630 may contain, among other things, a BIOS which may control basic hardware or software operation such as the interaction with peripheral components or devices.

Processor 640 may include an intelligent hardware device, (e.g., a general-purpose processor, a CPU, a microcontroller, an ASIC, an FPGA, a programmable logic device, a discrete gate or transistor logic component, a discrete hardware component, or any combination thereof). In some cases, processor 640 may be configured to operate a memory array using a memory controller. In other cases, a memory controller may be integrated into processor 640. Processor 640 may be configured to execute computer-readable instructions stored in a memory to perform various functions (e.g., functions or tasks supporting the coordination of wireless audio devices).

Figure 7:
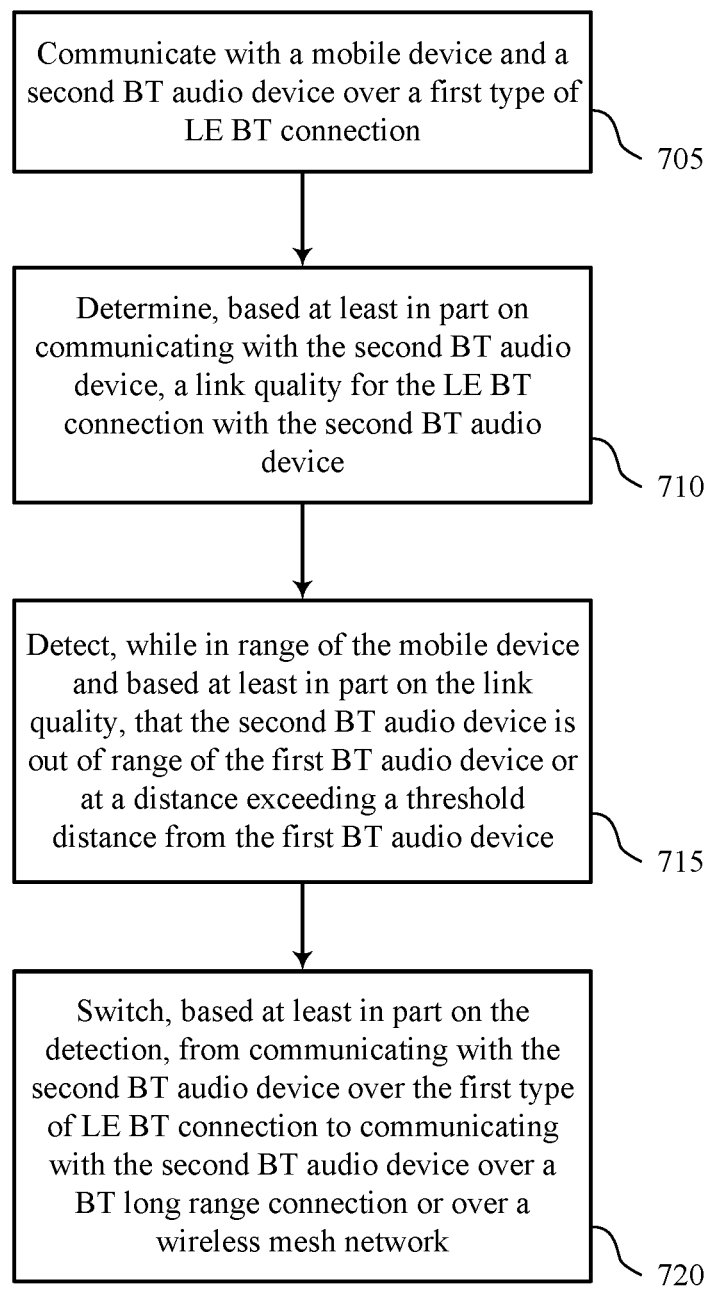
FIG. 7 shows a flowchart illustrating a method that supports coordination between wireless audio devices in accordance with aspects of the present disclosure.

FIG. 7 shows a flowchart illustrating a method 700 that supports coordination between wireless audio devices in accordance with aspects of the present disclosure. The operations of method 700 may be implemented by an audio device or its components as described herein. For example, the operations of method 700 may be performed by a communications manager as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 705, the device (referred to as the first BT audio device) may communicate with a mobile device and a second BT audio device over a first type of LE BT connection. The operations of 705 may be performed according to the methods described herein. In some examples, aspects of the operations of 705 may be performed by a Bluetooth communications manager 525 as described with reference to FIG. 5.

At 710, the first BT audio device may determine, based at least in part on communicating with the second BT audio device, a link quality for the LE BT connection with the second BT audio device. The operations of 710 may be performed according to the methods described herein. In some examples, aspects of the operations of 710 may be performed by a link manager 530 as described with reference to FIG. 5.

At 715, the first BT audio device may detect, while in range of the mobile device and based at least in part on the link quality, that the second BT audio device is out of range of the first BT audio device or at a distance exceeding a threshold distance from the first BT audio device. The operations of 715 may be performed according to the methods described herein. In some examples, aspects of the operations of 715 may be performed by a range detector 535 as described with reference to FIG. 5.

At 720, the first BT audio device may switch, based at least in part on the detection, from communicating with the second BT audio device over the first type of LE BT connection to communicating with the second BT audio device over a BT long range connection or over a wireless mesh network. The operations of 720 may be performed according to the methods described herein. In some examples, aspects of the operations of 720 may be performed by a long range communications manager 540 as described with reference to FIG. 5.

It should be noted that the method described above describes possible implementations, and that the operations and the steps may be rearranged or otherwise modified and that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first Bluetooth (BT) audio device, comprising:
    communicating with a mobile device and a second BT audio device over a first type of low energy (LE) BT connection;
    determining, based at least in part on communicating with the second BT audio device, a link quality for the LE BT connection with the second BT audio device;
    detecting, while in range of the mobile device and based at least in part on the link quality, that the second BT audio device is outside a range of the first BT audio device or at a distance exceeding a threshold distance from the first BT audio device;
    switching, based at least in part on the detection, from communicating with the second BT audio device over the first type of LE BT connection to communicating with the second BT audio device over a BT long range connection or over a wireless mesh network;
    determining, while communicating with the second BT audio device over the BT long range connection or the wireless mesh network and wherein the first BT audio device and the second BT audio device maintain separate LE BT connections of the first type with the mobile device, that the second BT audio device has re-entered the range of the first BT audio device; and
    switching from communicating with the second BT audio device over the BT long range connection or over the wireless mesh network to communicating with the second BT audio device over the first type of LE BT connection based at least in part on determining that the second BT audio device has re-entered the range of the first BT audio device.

2. The method of claim 1, further comprising:
    transmitting connection status information to the second BT audio device over the wireless mesh network based at least in part on switching to communicating with the second BT audio device over the wireless mesh network.

3. The method of claim 2, further comprising:
    receiving a request for connection status information from the second BT audio device over the wireless mesh network, wherein transmitting the connection status information is in response to the request.

4. The method of claim 3, wherein the connection status information comprises information for connecting to the first BT audio device or for connecting to the mobile device.

5. The method of claim 1, further comprising:
    transmitting an indication to the second BT audio device, based on detecting that the second BT audio device is outside the range or at the distance exceeding the threshold distance, that the first BT audio device is configured to interface with the mobile device on behalf of the second BT audio device.

6. The method of claim 1, further comprising:
    detecting that the second BT audio device is outside the range of the first BT audio device; and
    notifying the second BT audio device, over the BT long range connection or over the wireless mesh network through at least one device, that the first BT audio device is connected to the mobile device.

7. The method of claim 1, further comprising:
    maintaining the first type of LE BT connection with the mobile device after switching to communicating with the second BT audio device over the BT long range connection or over the wireless mesh network.

8. The method of claim 1, wherein communicating with the second BT audio device over the wireless mesh network comprises:
    transmitting information intended for the second BT audio device to at least one other BT device acting as a relay.

9. The method of claim 1, wherein determining the link quality comprises:
    determining one or more of a received signal strength indicator (RSSI) value, a quantity of retransmissions, or a quantity of packet errors.

10. The method of claim 1, wherein the first type of LE BT connection comprises 1M PHY or 2M PHY, and wherein the BT long range connection comprises coded PHY.

11. A first Bluetooth (BT) audio device for wireless communication, comprising:
    a processor;
    memory in electronic communication with the processor; and
    instructions stored in the memory and executable by the processor to cause the first BT audio device to:
    communicate with a mobile device and a second BT audio device over a first type of low energy (LE) BT connection;
    determine, based at least in part on communicating with the second BT audio device, a link quality for the LE BT connection with the second BT audio device;
    detect, while in range of the mobile device and based at least in part on the link quality, that the second BT audio device is outside a range of the first BT audio device or at a distance exceeding a threshold distance;
    switch, based at least in part on the detection, from communicating with the second BT audio device over the first type of LE BT connection to communicating with the second BT audio device over a BT long range connection or over a wireless mesh network;
    determine, while communicating with the second BT audio device over the BT long range connection or the wireless mesh network and wherein the first BT audio device and the second BT audio device maintain separate LE BT connections of the first type with the mobile device, that the second BT audio device has re-entered the range of the first BT audio device; and
    switch from communicating with the second BT audio device over the BT long range connection or over the wireless mesh network to communicating with the second BT audio device over the first type of LE BT connection based at least in part on determining that the second BT audio device has re-entered the range of the first BT audio device.

12. The first BT audio device of claim 11, further comprising instructions executable by the processor to cause the first BT audio device to:
   transmit connection status information to the second BT audio device over the wireless mesh network based at least in part on switching to communicating with the second BT audio device over the wireless mesh network.

13. The first BT audio device of claim 12, further comprising instructions executable by the processor to cause the first BT audio device to:
   receive a request for connection status information from the second BT audio device over the wireless mesh network, wherein the connection status information is transmitted in response to the request.

14. The first BT audio device of claim 11, further comprising instructions executable by the processor to cause the first BT audio device to:
   transmit an indication to the second BT audio device, based on detecting that the second BT audio device is outside the range or at the distance exceeding the threshold distance, that the first BT audio device is configured to interface with the mobile device on behalf of the second BT audio device.

15. The first BT audio device of claim 11, further comprising instructions executable by the processor to cause the first BT audio device to:
   detect that the second BT audio device is outside the range of the first BT audio device; and
   notify the second BT audio device, over the BT long range connection or over the wireless mesh network through at least one device, that the first BT audio device is connected to the mobile device.

16. A first Bluetooth (BT) audio device, comprising:
   means for communicating with a mobile device and a second BT audio device over a first type of low energy (LE) BT connection;
   means for determining, based at least in part on communicating with the second BT audio device, a link quality for the LE BT connection with the second BT audio device;
   means for detecting, while in range of the mobile device and based at least in part on the link quality, that the second BT audio device is outside a range of the first BT audio device or at a distance exceeding a threshold distance;
   means for switching, based at least in part on the detection, from communicating with the second BT audio device over the first type of LE BT connection to communicating with the second BT audio device over a BT long range connection or over a wireless mesh network;
   means for determining, while communicating with the second BT audio device over the BT long range connection or the wireless mesh network and wherein the first BT audio device and the second BT audio device maintain separate LE BT connections of the first type with the mobile device, that the second BT audio device has re-entered the range of the first BT audio device; and
   means for switching from communicating with the second BT audio device over the BT long range connection or over the wireless mesh network to communicating with the second BT audio device over the first type of LE BT connection based at least in part on determining that the second BT audio device has re-entered the range of the first BT audio device.

* * * * *